United States Patent
Lau et al.

(10) Patent No.: US 6,488,882 B2
(45) Date of Patent: Dec. 3, 2002

(54) POLYOLEFIN MATERIALS HAVING ENHANCED SURFACE DURABILITY AND METHODS OF MAKING THE SAME BY EXPOSURE TO RADIATION

(75) Inventors: Edmund K. Lau, Arlington, TX (US); Satchit Srinivasan, Carrollton, TX (US); Peter J. Perron, Arlington, TX (US); Peter S. Solera, Suffern, NY (US); Anthony DeBellis, Garnerville, NY (US); Chia-Hu Chang, West Nyack, NY (US); Gerald Capocci, Greenwich, CT (US); Joseph Puglisi, Ossining, NY (US); Douglas Horsey, Briarcliff Manor, NY (US)

(73) Assignees: Solvay Engineered Polymers, Grand Prairie, TX (US); Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/732,731

(22) Filed: Dec. 11, 2000

(65) Prior Publication Data

US 2001/0020047 A1 Sep. 6, 2001

Related U.S. Application Data

(63) Continuation-in-part of application No. 08/982,508, filed on Dec. 2, 1997, now abandoned.

(51) Int. Cl.$^7$ .............................. B29C 71/04; C08J 7/18; C08L 23/00; C08L 23/02; C08L 51/04
(52) U.S. Cl. ..................... 264/494; 264/496; 522/44; 522/39; 522/40; 522/46; 522/55; 522/64; 522/76; 522/78; 522/79; 522/81; 522/83; 522/112; 522/114; 522/121; 525/193; 525/194
(58) Field of Search .................... 264/496, 494; 522/44, 112, 114, 121, 79, 81, 83, 64, 74, 76, 78, 39, 40, 55, 46; 525/193, 194

(56) References Cited

U.S. PATENT DOCUMENTS

| | | |
|---|---|---|
| 4,000,216 A | 12/1976 | Lang .................... 260/857 UN |
| 4,039,720 A | 8/1977 | Cherenko et al. ............ 428/425 |
| 4,153,526 A | 5/1979 | Cherenko et al. ...... 204/159.21 |
| 4,227,979 A | 10/1980 | Humke et al. .......... 204/159.16 |
| 4,255,303 A | 3/1981 | Keogh ...................... 260/23 H |
| 4,303,697 A | 12/1981 | Baseden |
| 4,371,566 A | 2/1983 | Russell ....................... 427/53.1 |
| 4,478,876 A | 10/1984 | Chung ....................... 427/54.1 |
| 4,814,207 A | 3/1989 | Siol et al. ................ 427/393.5 |
| 4,902,578 A | 2/1990 | Kerr, III ..................... 428/522 |
| 4,921,669 A | 5/1990 | Vetter et al. ................. 264/134 |
| 4,945,005 A | 7/1990 | Aleckner, Jr. et al. ...... 428/500 |
| 4,997,720 A | 3/1991 | Bourbonais et al. ........ 428/500 |
| 5,006,436 A | 4/1991 | Hung et al. |
| 5,166,225 A | 11/1992 | Asanuma et al. |
| 5,202,361 A | 4/1993 | Zimmerman et al. |
| 5,316,791 A | 5/1994 | Farber et al. ............... 427/464 |
| 5,382,604 A | 1/1995 | Erickson ..................... 522/158 |
| 5,407,970 A | 4/1995 | Peterson et al. |
| 5,498,671 A | 3/1996 | Srinivasan ................... 525/240 |
| 5,558,911 A | 9/1996 | Blum .......................... 427/517 |
| 5,591,551 A | 1/1997 | Audett et al. ................. 430/18 |
| 5,618,586 A | 4/1997 | Swarup et al. ........... 427/407.1 |
| 6,339,112 B1 * | 1/2002 | Kauffman et al. ............. 522/95 |

FOREIGN PATENT DOCUMENTS

| | | |
|---|---|---|
| EP | 0 738 927 | 10/1996 |
| EP | 0 921 152 | 6/1999 |
| JP | 57-065710 | 4/1982 |
| JP | 58-098704 | 6/1983 |
| JP | 59-187656 | 10/1984 |

OTHER PUBLICATIONS

"Plastics Additives Handbook" 4$^{th}$ ed., R. Gachter et al. ed., Hanser Publishers, New York, pp. 36–41 and 539–540)1993).*
T. Nomura et al., "Characterization of Microstructure and Fracture Behavior of Polypropylene/Elastomer Blends Containing Small Crystal in Elastomeric Phase," *J. Applied Polymer Sci.*, 55:1307–1315 (1995).
E. Lau et al, "Novel Precolored TPO Systems Suitable for Partially Painted and Non–Painted Exterior Automotive Applications," *ANTEC '93*, 2486–2491.
E. Lau et al., "Mar Resistance of Polyolefins: Mechanisms, Measurement, and Materials", presented at "TPOs in Automotive" Conference, Novi, Michigan, Oct. 28–30, 1996.
Derwent WPI Accession No. 94–031922/199404, English language abstract of Japan 5339441 A.
CAPLUS Accession No. 1995:438027, English langauge abstract of Japan 06256538 A2.
Lieberman, "Polypropylene", Kirk' Othmer Encyclopedia of Chemical Technology, 4$^{th}$ Ed., vol. 17, John Wiley & Sons, New York, pp. 784, 789 (1995).

* cited by examiner

Primary Examiner—D. R. Wilson
(74) Attorney, Agent, or Firm—Wenderoth, Lind & Ponack, L.L.P.

(57) ABSTRACT

The invention relates to thermoplastic polyolefin compositions having enhanced surface durability and products thereof which include a thermoplastic polyolefin base component at least one radiation-crosslinkable component present in an amount sufficient to enhance the surface durability of the thermoplastic polyolefin component when radiation-cured and at least one photoinitiator present in an amount sufficient to initiate crosslinking of the radiation-crosslinkable component upon exposure of the thermoplastic polyolefin composition to radiation. The invention further relates to methods of providing a cured thermoplastic polyolefin composition having enhanced surface durability by preparing a mixture having a thermoplastic polyolefin base component, at least one radiation-crosslinkable component in an amount sufficient to enhance the surface durability of the polyolefin when radiation cured, and at least one photoinitiator each in an amount sufficient to facilitate crosslinking of the radiation-crosslinkable component when a surface of the thermoplastic polyolefin composition is exposed to radiation, and then exposing the thermoplastic polyolefin composition to radiation in an amount sufficient to crosslink the radiation-crosslinkable component thereby providing a thermoplastic polyolefin composition having enhanced surface durability.

32 Claims, No Drawings

POLYOLEFIN MATERIALS HAVING ENHANCED SURFACE DURABILITY AND METHODS OF MAKING THE SAME BY EXPOSURE TO RADIATION

This application is a continuation-in-part of application Ser. No. 08/982,508, filed Dec. 2, 1997, now abandoned.

TECHNICAL FIELD

This invention relates to thermoplastic, polyolefin materials ("polyolefins") having superior mar, scratch, wear, and abrasion resistance and methods of making such polyolefins by exposure to radiation to crosslink unsaturated polyolefins therein.

BACKGROUND OF THE INVENTION

Polyolefins are useful in a wide variety of applications due to their strength, environmental resistance and moldability. Many polyolefins are too easily scratched, marred, worn, abraded or otherwise damaged on their surface. These surface characteristics may be measured in a variety of ways. For example, scratch resistance may be measured by vertically penetrating a scratch needle, with a spherical tip into a polyolefin or other material surface under a constant load. The needle is then moved horizontally at a constant rate, and the width and/or depth of any formed scratch is measured (See, e.g., T. Nomura, et al., *J. Applied Polymer Sci.* 55:1307–1315 (1995)). Generally, it has been desired to enhance the service life of a polyolefin by improving these surface characteristics to reduce scratching, marring, wearing, abrasion, and the like.

One conventional method to enhance surface characteristics has been to use inorganic particulate material, such as various silicas. Uniform dispersion of these particulates is difficult to achieve, however, and this results in non-uniform surface properties in such products. The use of these particulates also tends to damage other desirable physical properties of the polyolefin, resulting in loss of impact strength, toughness, processability, and the like.

A more effective conventional method of providing surface enhancing characteristics to certain polyolefins is disclosed in U.S. Pat. No. 4,921,669. This patent discloses passing a web of extruded thermoplastic synthetic resin through a polishing roll stack, wherein at least one of the rolls has thereon a film of a material forming such a scratch resistant coating that is transferred from the roll to the web surface. Such conventional methods of enhancing the surface characteristics of a polyolefin require expensive, bulky equipment that also increase the processing time of polyolefin products.

Another way to enhance surface characteristics of polyolefins is described in U.S. Pat. No. 4,000,216, which discloses an extrudable, moldable, or heat formable blend of a thermoplastic polymer and a surface altering agent of at least one monoethylenically unsaturated monomer for said thermoplastic polymer, wherein the surface altering agent has cross-linked polymer particles having an average size of 1 to 30 m. The surface altering agent is preferably prepared by an endopolymerization, which is used with a compatible polyolefin to be altered.

Another conventional way to enhance surface characteristics of various articles is to apply acrylic polymers or coatings to an article and subsequently cure the polymer or coating with a radiation source, such as ultraviolet radiation ("UV"). The following patents describe a variety of examples of such conventional "apply coating and cure" methods and compositions.

U.S. Pat. Nos. 4,153,526 and 4,039,720 disclose safety glass made by laminating a saturated polyvinyl acetal film and a photoinitiator to a ply of glass, and irradiating the film with UV to initiate crosslinking and to provide improved solvent-abrasion resistance. U.S. Pat. No. 4,227,979 discloses radiation-curable coating compositions including one or more amide acrylate compounds that form mar-resistant protective and decorative film coatings.

U.S. Pat. No. 4,255,303 discloses a composition for coating electrical applications including ethylene polymer and at least 10 parts by weight of talc filler per 100 parts by weight of polymer, where the talc is coated with at least one metallic salt of a fatty acid having 8 to 20 carbon atoms. The ethylene polymers may be curable by irradiation with high-energy electron beams or a chemical curing agent, such as organic peroxide. U.S. Pat. No. 4,371,566 discloses actinic radiation curable coating compositions for application to many substrates having a pentaerythritol-based polyacrylate or polymethacrylate, such as pentaerythritol tetraacrylate, a vinyl chloride-vinyl acetate containing polymer, and a photoinitiator, preferably applied by spraying a solution onto the substrate.

U.S. Pat. No. 4,478,876 discloses a process of coating a solid substrate with an abrasion resistant silicone hard coating curable upon UV exposure under a non-inert atmosphere, such as air. The composition includes a UV crosslinkable polyfunctional acrylate monomer, $SiO_2$ in the form of colloidal silica, and acryloxy functional silanes and a selected blend of ketone-type and hindered amine-type photoinitiators.

U.S. Pat. No. 4,814,207 discloses a method for applying a scratch and weather resistant film coating to a shaped article by applying to the article a thin film of a mixture of free radically polymerizable monomer having at least two polymerizable olefinic bonds, a peroxide initiator having a half life of less than two minutes at 100° C., and an ultraviolet stabilizer, and curing the film by heating it to a temperature greater than 70° C. U.S. Pat. No. 4,902,578 discloses a radiation-curable coating for thermoplastic substrates having a polyfunctional acrylic monomer, a mono-, di-, or trifunctional acrylic monomer, a thermoplastic or elastomeric polymer, and a photoinitiator.

U.S. Pat. No. 5,006,436 discloses a UV curable, aqueous alkaline developable solder mask composition having a thermal free radical initiator capable of generating free radicals with heat, and a polyunsaturated compound capable of being thermally crosslinked by the free radicals to provide a substantially fully cured coating. U.S. Pat. No. 5,316,791 discloses a process for improving the impact resistance of a coated plastic substrate by applying an aqueous polyurethane dispersion as a primer layer, partially curing the layer by air drying, applying a coating composition over the primer layer, and curing the coating composition to form an abrasion-resistant hard coat. U.S. Pat. No. 5,382,604 discloses a crosslinked adhesive composition having an epoxidized diolefin block polymer crosslinked by UV radiation through at least some of the epoxy functionality.

U.S. Pat. No. 5,558,911 discloses a method of coating articles with powder coatings having polymers applied to the substrate to be coated, melting the polymers, and crosslinking by UV radiation.

U.S. Pat. No. 5,591,551 discloses a lithographic coating and method of coating at least a portion of a surface allow of an article with a radiation-crosslinkable polymer and exposing it to a pattern of radiation to produce an image. The polymer is disclosed to be a copolymer of an isoolefin of 4–7 carbon atoms and para-alkylstyrene.

U.S. Pat. No. 5,618,586 discloses self-crosslinkable film-forming compositions as coatings and a process for preparing multi-layered coated articles with a colored base coat and a clear top coat, wherein the composition includes a non-gelled addition polymer that is the free radical initiated reaction product of an N-alkoxymethyl (meth) acrylamide and at least one other ethylenically unsaturated monomer.

These conventional curable products generally require several steps, particularly coating or effectively laminating a prepared product with the UV-curable coating. However, it would be advantageous to provide independent polyolefin compositions that are capable of being cured without the need for additional processing steps, such as coating or laminating an article with a curable composition. It is thus desired to produce such a product, preferably one having enhanced surface durability. The present invention provides new polyolefin compositions that satisfy this need.

SUMMARY OF THE INVENTION

The present invention relates to a thermoplastic polyolefin composition having enhanced surface durability, which includes a base component of a thermoplastic polyolefin, at least one radiation-crosslinkable component present in an amount sufficient to enhance the surface durability of the thermoplastic polyolefin base component when radiation-cured, and at least one photoinitiator present in an amount sufficient to initiate crosslinking of the radiation-crosslinkable component upon exposure of the thermoplastic polyolefin composition to radiation.

In one embodiment, the polyolefin composition also includes a filler in an amount of between 0.1 to 30 weight percent. In a preferred embodiment, the filler includes calcium carbonate, clay, talc, mica, glass, zinc oxide, wollastonite, silica, titanium dioxide, or mixtures thereof.

In another embodiment, the thermoplastic polyolefin base component is thermally treated prior to or subsequent to radiation exposure. The thermal treatment may vary in intensity from 25° C. to 150° C. and may vary in duration from a few minutes up to a few days (e.g., from 2 minutes to 48 hours) depending on the temperature and desired extent of cure. Alternately, the base component can be subjected to a series of alternating thermal and radiation treatments which may be of varying duration lengths depending on the desired physical properties.

The compositions may contain photo-oxidative stabilizers that prevent environmental degradation of the thermoplastic polyolefin base component without interfering substantially with the photoinitiated surface crosslinking.

The thermoplastic polyolefin base component may include a blend of a crystalline or semi-crystalline poly-α-olefin and an amorphous poly-α-olefin. In a preferred embodiment, the thermoplastic polyolefin base component includes a blend of semi-crystalline polypropylene and amorphous ethylene/α-olefin copolymer. In another embodiment, the amorphous poly-α-olefin includes amorphous copolymer of ethylene and at least one diene. Generally, the thermoplastic polyolefin base component is present in an amount of about 99 to 55 weight percent of the composition. In a preferred embodiment, the thermoplastic polyolefin base component is present from about 95 to 65 weight percent of the composition.

The radiation-crosslinkable component may include an unsaturated polyolefin. In a preferred embodiment, the unsaturated polyolefin includes an ethylene, propylene and diene terpolymer; polybutadiene; polyisoprene; a styrenic polymer; an ethylene and propylene copolymer; methacrylate grafted polybutadiene or mixtures thereof. Typically, the radiation-crosslinkable component is present in an amount of about 1 to 30 weight percent of the thermoplastic polyolefin composition.

The photoinitiator may be any one of benzoin and benzoin ether derivatives; benzil ketal derivatives; α,α-dialkyoxyacetophenone derivatives; α-aminoalkylphenone derivatives; α-hydroxyalkylphenone derivatives; acylphosphine oxides; acylphosphine sulfides; phenylglyoxylate derivatives; O-acyl-2-oximino ketone derivatives; benzophenone and its derivatives; Michler's ketone and its derivatives; thioxanthone and its derivatives; mixtures thereof; and all the polymer-bound compounds of the type mentioned above. In a preferred embodiment, the photoinitiator is benzil ketal derivatives; and acylphosphine oxides. The photoinitiator is typically present in an amount of about 0.01 to 5 weight percent of the composition. Mixtures of photoinitiators may also be used, along with accelerators that facilitate rapid crosslinking.

The invention also relates to a method of providing a cured thermoplastic polyolefin composition having enhanced surface durability by preparing a mixture of a thermoplastic polyolefin base component, at least one radiation-crosslinkable component in an amount sufficient to enhance the surface durability of the thermoplastic polyolefin component when radiation cured, and at least one photoinitiator in an amount sufficient to facilitate crosslinking of the radiation-crosslinkable component when the thermoplastic polyolefin composition is exposed to radiation, and then exposing a surface of the thermoplastic polyolefin composition to radiation in an amount sufficient to crosslink the radiation-crosslinkable component at least at the exposed surface, thereby providing a thermoplastic polyolefin composition having enhanced surface durability.

In one embodiment, the radiation is selected to be ultraviolet, electron beam, gamma, visible, microwave, infrared, or thermal radiation, or mixtures thereof. In another embodiment the radiation is imparted at a power of 0.1 J/cm$^2$ and above and at a wavelength between about 200 to 500 nm.

In a preferred embodiment, the thermoplastic polyolefin base component is selected to be a blend of a crystalline or semicrystalline poly-α-olefin and an amorphous poly-α-olefin, the radiation-crosslinkable component is selected to be an unsaturated polyolefin that is present in about 0.01 to 20 weight percent of the composition, the photoinitiator is selected to be benzil ketals or phosphine oxides present in about 0.1 to 5 weight percent of the composition, and a filler is added to the mixture. The method may further include forming the thermoplastic polyolefin composition into a desired shape prior to exposing the surface of the composition to the radiation.

The invention also relates to a thermoplastic polyolefin composition having enhanced surface durability formed by the above-described method. In one embodiment, the composition has an outer surface that contains a polymerized component so that the surface scratch resistance after irradiation has a rating of 1.5 or lower on the Solvay scale (see definition below) after cure.

DETAILED DESCRIPTION OF THE INVENTION

Polyolefin compositions having enhanced surface durability, and a process for making the same, have now been advantageously discovered. The polyolefin compositions of the present invention include a thermoplastic polyolefin base component, a radiation-crosslinkable component, and a photoinitiator, together with one or more optional fillers used to create a final product having desired characteristics. The present invention is believed to influence the mechanics of surface deformation and recovery by preferentially introducing crosslinks near the surface of a formed article made from the polyolefin composition. Thus, the polyolefin compositions exhibit superior durability and resistance to marring, scratching, wear, abrasion, and other surface damage without the need for a cumbersome coating-type process.

The terms "thermoplastic polyolefin composition" or "polyolefin composition" are intended to include any composition that contains one or more crystalline or semi-crystalline olefin polymers, such as polyethylene, polypropylene or other $C_5$–$C_{20}$ olefins. The crystallinity of such olefins can range from 30 to 100%. Mixtures of these polymers are contemplated as part of the invention, as well. Other components that typically can be included in such polyolefin compositions are amorphous polymers of $C_3$–$C_{20}$ olefins, whether used alone or as co-polymers of two different olefins or as terpolymers of three different olefins. Such amorphous components are typically added to enhance the low temperature impact or paintability properties of the polyolefin composition. For example, the polymer composition of U.S. Pat. Nos. 4,945,005, 4,997,720 and 5,498,671 can be used as the polyolefin component in this invention.

The polyolefin compositions of the invention may include any thermoplastic polyolefin base component of one or more polyolefins that do not crosslink but that have compatibility with one or more unsaturated polyolefins that are capable of crosslinking under irradiation, although the polyolefin base component is preferably a polyolefin, more preferably a blend of a crystalline or semi-crystalline poly-α-olefin and an amorphous poly-α-olefin, and most preferably a blend of a semicrystalline propylene homopolymer or copolymer with another poly-α-olefin and an amorphous copolymer or terpolymer of ethylene with another α-olefin or diene. Although any diene is suitable for use in a co- or terpolymer, preferably the diene is ethylidine norbornene, dicyclopentadiene, or hexadiene. The most preferred polyolefin base component includes a semi-crystalline polypropylene blended with an ethylene/α-olefin copolymer. The term "poly-α-olefin(s)" used in the invention means alkenes of 1 to 20 carbon atoms, preferably 1 to 10 carbon atoms, having a double bond between the first and second carbon atoms. The polyolefin component is a base component, i.e., is the predominant component in the composition, and is not capable of crosslinking under the radiation described herein. This base component is typically present in an amount of about 99 to 55 weight percent of the composition, preferably about 95 to 65 weight percent of the composition, and more preferably about 90 to 70 weight percent of the composition. The polyolefin component, or polyolefin base component, is generally the remainder of the polyolefin composition after the radiation-crosslinkable component, photoinitiator and any optional filler are combined.

The polyolefin of the polyolefin base component is considered semi-crystalline when it has a crystallinity of at least about 30%, while fully crystalline materials, having a crystallinity of from 70 to 100% as determined by X-ray diffraction, are also suitable. When polypropylene is the selected olefin, a degree of crystallinity of between 30 to 98% is acceptable to achieve sufficiently crystalline behavior, although 60 to 70% is preferred, amorphous polyolefins typically have a crystallinity of below 30%. The molecular weight average of the polyolefin is typically between 10,000 and 300,000, more typically between 50,000 and 150,000. Blends of different molecular weight polymers may be utilized, if desired.

The enhanced surface durability polyolefin composition also includes a radiation-crosslinkable component and a photoinitiator. The radiation-crosslinkable component is typically an unsaturated polyolefin. The unsaturated polyolefin may be any suitable polyolefin described herein for the polyolefin component, except that it should have at least about one percent of its covalent bonds unsaturated. It is preferred to have greater unsaturation in the radiation-crosslinkable component, which results in greater and more rapid crosslinking when exposed to radiation and ultimately enhances the surface characteristics of the polyolefin composition to a greater extent. The unsaturated polyolefin may be, for example, an ethylene, propylene and diene terpolymer; polybutadiene; polyisoprene; a styrenic polymer; a methacrylate grafted polybutadiene or a mixture thereof; or the like. Preferably, however, the radiation-crosslinkable component is an ethylene/α-olefin copolymer, and more preferably an copolymer of ethylene and propylene. The radiation-crosslinkable component is present in an amount sufficient to enhance the surface durability of the polyolefin composition when radiation-cured. The radiation-crosslinkable component is preferably present in about 1 to 30 weight percent, more preferably about 5 to 20 weight percent, and most preferably about 10 to 15 weight percent, of the polyolefin composition.

The term "methacrylate grafted polybutadiene" is known to those skilled in the art. According to this invention "methacrylate grafted polybutadiene" encompasses polymers with methacrylate groups grafted to polybutadiene by any known method, for example coupling through free radical reactions, through linking groups, and so on.

Methacrylate grafted polybutadiene may be prepared for example, by any method as described in U.S. Pat. Nos. 4,857,434, 3,957,903, 4,085,166, 3,910,992 and 5,362,806, all incorporated herein by reference. Methacrylate grafted polybutadienes where the methacrylate groups are grafted onto a maleated polybutadiene as described in U.S. Pat. Nos. 4,857,434 and 5,362,806 are advantageously employed.

The preferred methacrylate grafted polybutadienes of this invention may simply be composed of maleated polybutadiene and a functional methacrylate such as hydroxyethyl methacrylate or glycidyl methacrylate, such as described in U.S. Pat. Nos. 4,857,434 and 5,362,806. They may further include other components as described in U.S. Pat. No. 5,362,806.

Some of the preferred methacrylate grafted polybutadienes of this invention are commercially available, for instance the Ricacryl® methacrylated polybutadienes available from Ricon Resins, Grand Junction, Colo. Specific examples are Ricacryl® 131MA17 and Ricacryl® 3500.

In addition to polybutadiene, other polymeric substrates may be methacrylate grafted and employed as the radiation-crosslinkable component according to this invention. Other suitable substrates for methacrylate grafting as described above are for example copolymers of ethylene, propylene and diene monomers.

Other examples of radiation crosslinkable components include glycidyl ethers of polyhydric alcohols such as those described in U.S. Pat. No. 3,910,922, incorporated herein by reference.

Modifications to the crosslinkable component are possible such as incorporation of tetrafluoroethylene monomer or styrene monomer in the backbone which may impart desirable properties other than sites for crosslinking.

The polyolefin composition also includes a photoinitiator, or free radical initiator, to facilitate curing of the polyolefin composition when irradiated. The photoinitiator may include any compounds capable of initiating free radical cleavage to crosslink the radiation-crosslinkable component. Suitable photoinitiators typically include benzoin and benzoin ether derivatives; benzil ketal derivatives; α,α-dialkyoxyacetophenone derivatives; α-aminoalkylketone derivatives; α-hydroxyalkylketone derivatives; mono- or bis-acylphosphine oxides; mono- or bis-acylphosphine sulfides; phenylglyoxylate derivatives; O-acyl-2-oximino ketone derivatives; benzophenone and its derivatives; Michler's ketone and its derivatives; thioxanthone and its derivatives; and all the polymer-bound compounds of the type mentioned above. and the like. Specific photoinitiators can include for example 2,2-dimethoxy-2-phenylacetophenone, bis(2,6-dimethoxybenzoyl)-2,4,4-trimethylpentyl phosphine oxide, 2-benzyl-2-(N,N-dimethylamino)-1-(4-morpholinophenyl)-1-butanone, 2-methyl-1-(4-methylthiophenyl)-2-morpholino-propan-1-one and 1-hydroxy-cyclohexylphenyl ketone. Preferred photoinitiators are of the type-benzil ketal derivatives and acylphosphine oxides or a mixture thereof. The photoinitiator is typically present in an amount sufficient to initiate crosslinking of the radiation-crosslinkable component when the polyolefin composition is exposed to radiation. Preferably, the photoinitiator is present in an amount of about 0.01 to 5 weight percent, more preferably about 0.05 to 4 weight percent, and most preferably about 0.1 to 3 weight percent, of the polyolefin composition. As photoinitiators tend to be costly, it is also preferred to use the least amount of photoinitiator necessary to cure the polyolefin composition in a sufficiently rapid manner.

Fillers may optionally be included within the polyolefin compositions of the present invention. Calcium carbonate, clay, talc, mica, wollastonite, glass, silica, zinc oxide, titanium dioxide, and the like are all suitable fillers for use with the polyolefins. The most appropriate fillers are typically selected depending upon the desired qualities in the final polyolefin products, and selecting such fillers is readily accomplished by one of ordinary skill in the art. The fillers are typically present in an amount of about 1 to 30 weight percent, and preferably between 5 to 15 weight percent, of the polyolefin composition.

To prepare the polyolefin composition, a polyolefin component, at least one radiation-crosslinkable component, at least one photoinitiator, and any optional filler(s) are combined to form a curable composition. The various components are typically mixed and the radiation-crosslinkable component, photoinitiator, and polyolefin component are preferably, substantially uniformly dispersed.

The polyolefin composition can also include one or more stabilizers to impart stability to the composition during mixing, during mechanical processing and during the intended end use application which may include exposure to elevated temperatures or exposure to sunlight or both. The stabilizers of the instant invention may be selected from the following:

1. Antioxidants
1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)-phenol, 2,4-dimethyl-6-(1'-methylheptadec-1'-yl)phenol, 2,4-dimethyl-6-(1'-methyltridec-1'-yl)phenol and mixtures thereof.

1.2. Alklthiomethylphenols, for example 2,4-dioctylthiomethyl-6-tert-butylphenol, 2,4-di-octylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxy-phenol, 2,5-di-tert-butylhydroquinone, 2,5-di-tert-amylhydroquinone, 2,6-diphenyl-4-octa-decyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis-(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonyl-phenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methyl-phenyl)butane, 1,1-bis(5-tert-butyl-4-hydroxy-2-methyl-phenyl)-3-n-dodecylmercapto-butane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxy-phenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo-[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, di-ethylene glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)-oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)hydrazine.

1.18. Ascorbic acid or derivatives, for example, a salt or ester of ascorbic acid, such as ascorbyl palmitate, dipalmitate L-ascorbate, sodium L-ascorbate-2-sulfate, organ ascorbic salt, such as sodium, potassium, and calcium, or mixtures thereof.

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis-(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, Bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazin, N,N,N',N'-tetraphenyl-1,4-diaminobut-2-ene, N,N-bis(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'- tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)-benzotriazole, 2-(3'-tert-butyl-5'-[2-(2-ethylhexyloxy)carbonylethyl]-2'-hydroxyphenyl)-benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol300;, where R=3'-tert-butyl4'-hydroxy-5'-2H-benzotriazol-2-ylphenyl.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetra-methylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis-(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dion, bis(1-octyloxy-2,2,6,6-tetramethylpiperidyl)sebacate, bis(1-octyloxy-2,2,6,6-tetramethylpiperidyl)succinate, the condensate of N,N'-bis-(2,2,6,6-tetramethyl-4-piperidyl) hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis (2,2,6,6-tetramethyl-4-piperidyl)hexamethylenediamine and 4-cyclohexylamino-2,6-dichloro-1,3,5-triazine, a condensation product of 1,2-bis(3-aminopropylamino) ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro[4,5]decane and epichlorohydrin.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide and mixtures of ortho- and para-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxy-phenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2- hydroxy-4-methoxyphenyl)-4,6-diphenyl-1,3,5-triazine, 2,4,6-tris[2-hydroxy-4-(3-butoxy-2-hydroxypropoxy) phenyl]-1,3,5-triazine, 2-(2-hydroxyphenyl)-4-(4-methoxyphenyl)-6-phenyl-1,3,5-triazine.

3. METAL DEACTIVATORS, for example N,N'-diphenyloxamide, N-salicylal-N'-salicyloyl hydrazine, N,N'-bis(salicyloyl) hydrazine, N,N'-bis(3,5-di-tert-butyl-4-hydroxy-phenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. PHOSPHITES AND PHOSPHONITES, for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methyl-phenyl)methylphosphite, bis(2,4-di-tert-butyl-6-methylphenyl)ethylphosphite.

5. HYDROXYLAMINES, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. NITRONES, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridecyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. THIOSYNERGISTS, for example, dilauryl thiodipropionate or distearyl thiodipropionate.

8. PEROXIDE SCAVENGERS, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. BASIC CO-STABILISERS, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or tin pyrocatecholate.

10. OTHER ADDITIVES, for example, plasticisers, lubricants, emulsifiers, pigments, rheology additives, catalysts, flow-control agents, optical brighteners, flame-proofing agents, antistatic agents and blowing agents.

11. BENZOFURANONES AND INDOLINONES, for example those disclosed in U.S. Pat. Nos. 4,325,863, 4,338,244, 5,175,312, 5,216,052, 5,252,643, DE-A-4316611, DE-A-4316622, DE-A-4316876, EP-A-0589839 or EP-A-0591102 or 3-[4-(2-acetoxyethoxy) phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy] phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one.

The concentration of the costabilizer in the thermoplastic polyolefin composition is usually from 0.1 to 5 percent by weight of the composition.

The polyolefin composition is then preferably formed into a desired product by a variety of conventional means, such as injection molding, coinjection molding, blow molding, extrusion, and the like. One of ordinary skill in the art can envision a broad array of useful, desired products easily manufactured by the present invention, including electrical components such as electrode manufacture or insulation, surface treatment of a variety of materials, and automotive parts. A variety of applications may be useful just in the automotive field, although they apply to a variety of other fields of endeavor. It is clear that interior and exterior automotive applications such as instrument panels, thermoformed skins, bumper fascia, claddings, and other interior and exterior trim components can be readily produced with superior durability due to the present invention.

The polyolefin composition in its uncured state is cured by subjecting the composition to irradiation. The radiation-crosslinkable component crosslinking is initiated by a source of ionizing radiation capable of producing free radicals, such as gamma, UV, electron beam, visible, microwave, or infrared radiation. More than one type of radiation may be used, although this is typically avoided due to cost considerations. Preferably, UV or electron beam radiation is used for the curing process.

For example, when UV radiation is used as the radiation source, the curing process requires at least one UV lamp that directs UV light onto the formulated product. These UV lamps may provide either arc light, which includes a medium pressure mercury lamp and a high pressure xenon lamp, or laser light. The photoinitiator(s) used must have an absorption spectra that at least partially overlaps with the emission spectra of the UV lamp, such that the photoinitiator is capable of absorbing the UV energy. The photoinitiator rapidly initiates a chemical reaction that quickly converts the resin, or radiation-crosslinkable component, into a cured (crosslinked) form. This photoinitiated curing typically occurs in less than one second, although this will depend on the rate of UV energy transfer. The UV energy preferably has a wavelength of between about 300 to 400 nm. The radiation source typically provides energy at a rate of about 2–15 J/cm$^2$. For example, a lamp of about 1–6 J/cm$^2$ would typically take less than one second to cure a thermoplastic polyolefin composition. It of course is possible for other cure mechanisms (such as thermal or moisture induced curing) to continue well after photoinitiated crosslinking is complete.

A test was developed by Solvay Engineered Polymers to measure relative surface scratch resistance. For this test, the test specimens are at least 4"×4" (100 mm×100 mm) in dimensions, with a hole drilled in the middle for mounting.

A Taber Abrasion test machine (described further in ASTM D1044) was modified by substituting a stainless steel slider with a sharp tip (radius ca. 0.25 mm) in place of the sanding wheels to scratch the surface of the specimens. With the tip offset 34 mm from the center of rotation and the turntable spinning at 72 rpm, the actual sliding velocity is equal to 25 mm/sec, which is similar to the condition of someone scratching a surface at normal speed with a fingernail. The test is terminated after one single revolution. The normal load used for this test is 1 lb. Upon completion of the test, the specimens are then rated visually on a numerical scale of 1 to 5 (1=excellent, hardly any marring is visible; 5=badly scratched). The width of the wear track and the characteristics of the failure surface can also be further studied with an optical microscope or more sophisticated instruments such as surface profilometer and scanning force microscope. The typical dimensions of the wear paths corresponding to the mar ratings are as follows:

| Mar Rating | Width of Scratch ($\mu$m) | Relative Performance |
|---|---|---|
| 1 | <50 | Excellent |
| 1.5 | 50–200 | Very good |
| 2 | 200–300 | Good |
| 3 | 300–400 | Fair |
| 4 | 400–500 | Bad |
| 5 | >500 | Poor |

A value of 1.5 or less in this test is indicative of very good or excellent performance.

EXAMPLES

The invention is further defined by reference to the following examples describing in detail the preparation of the compositions of the present invention. It will be apparent to those of ordinary skill in the art that many modifications, both to materials and methods, may be practiced without departing from the purpose and intent of this invention.

Photoinitiator A is 2,2-dimethoxy-2-phenylacetophenone and photoinitiator B is 2-methyl-1-[4-(methylthio)phenyl]-2-morpholino propan-1-one.

Examples 1–2
UV Irradiation with and without Photoinitiator

Examples 1–2, set forth in Table I below, compare samples of polyolefin component and radiation-curable component both with and without a photoinitiator that were subjected to UV radiation by a mercury lamp. The formula with photoinitiator showed significant increase in Shore hardness upon irradiation, whereas the formula without photoinitiator showed no change in Shore hardness. After soaking both formulations in xylene for four hours, the sample with photoinitiator also showed less weight increase, indicating there was crosslinking on the surface that was slowing down the diffusion of xylene into the 5 sample plaque. The feasibility of the UV curing process is thus confirmed.

TABLE I

Indication of Crosslinking via UV-Curing

| Composition (wt %) | Example 1 (Control) | Example 2 |
|---|---|---|
| Polypropylene[1] | 30 | 28.8 |
| Polybutadiene[2] | 69.8 | 67 |

TABLE I-continued

Indication of Crosslinking via UV-Curing

| Composition (wt %) | Example 1 (Control) | Example 2 |
|---|---|---|
| Photoinitiator A | 0 | 4 |
| Antioxidant[3] | 0.2 | 0.2 |
| Irradiation Source | Mercury Lamp (H bulb) | Mercury Lamp (H bulb) |
| Atmosphere | Nitrogen | Nitrogen |
| Irradiation Level | 2 and 4 J/cm$^2$ | 2 and 4 J/cm$^2$ |
| Shore "A" | | |
| (0 J/cm$^2$) | 87 | 86 |
| (2 J/cm$^2$) | 88 | 89 |
| (4 J/cm$^2$) | 90 | 95 |
| Shore "D" | | |
| (0 J/cm$^2$) | 25 | 21 |
| (0 J/cm$^2$) | 24 | 26 |
| Wt. Increase after 4-hr Xylene Soak | | |
| (2 J/cm$^2$) | 104% | 89% |
| (4 J/cm$^2$) | 96% | 59% |

[1]isotactic polypropylene, $M_w$ = 240,000; $M_w/m_n$ = 4.1;
[2]amorphous cis-1,4 polybutadiene, Mooney Viscosity ML (1+4, 100C) = 40.
[3]antioxidant = 1:1 tetrakis[methylene (3,5-di-tert-butyl-4-hydroxy-hydrocinnamate] methane/tris(2,4-di-tert-butylphenyl) phosphite Examples 3–5
Surface Characteristics Based on Photoinitiation Examples 3–5, set forth in Table II below, compared the surface hardness and mar resistance performance of representative engineered polyolefin blends before and after photoinitiation. In this experiment, a mercury "D" bulb was used as a radiation source. This bulb has lower emissions at short wavelengths and enhanced emissions at longer wavelengths when compared to the mercury "H" bulb. Examples 4 and 5, using photoinitiator "A" and photoinitiator "B" respectively, exhibited significantly bigger increases in hardness and much improved mar resistance than the sample without photoinitiator in Example 3.

TABLE II

Improvement of Surface Durability through a Mercury Lamp UV-Curing Process

| Compositions (wt %) | Ex.3 (control) | Example 4 | Example 5 |
|---|---|---|---|
| Polypropylene[1] | 69.8 | 67.8 | 67.8 |
| Poly(ethylene-co-α-olefin)[2] | 15 | 15 | 15 |
| Methacrylate grafted polybutadiene[3] | 15 | 15 | 15 |
| Photoinitiator A | 0 | 2 | 0 |
| Photoinitiator B | 0 | 0 | 2 |
| Antioxidant[4] | 0.2 | 0.2 | 0.2 |
| Irradiation Source | Mercury Lamp with "D" Bulb | | |
| Atmosphere | Air | | |
| Irradiation Energy | Two levels: 2.7 and 5.5 J/cm$^2$ | | |
| Test Results after UV-cure: | | | |
| Shore "D" | | | |
| (0 J/cm$^2$) | 66 | 65 | 65 |
| (2.7 J/cm$^2$) | 67 | 68 | 69 |
| (5.5 J/cm$^2$) | 67 | 69 | 70 |
| Rockwell "R" | | | |
| (0 J/cm$^2$) | 72. | 68 | 68 |
| (2.7 J/cm$^2$) | 72 | 73 | 76 |
| (5.5 J/cm$^2$) | 73 | 75 | 80 |

TABLE II-continued

Improvement of Surface Durability
through a Mercury Lamp UV-Curing Process

| Compositions (wt %) | Ex.3 (control) | Example 4 | Example 5 |
|---|---|---|---|
| Scratch Rating (Solvay Test*) | | | |
| (0 J/cm$^2$) | 3.5 | 3.5 | 3.5 |
| (2.7 J/cm$^2$) | 2.5 | 2.5 | 3.0 |
| (5.5 J/cm$^2$) | 3.0 | 1.5 | 2.0 |

[1] isotactic polypropylene, $M_w$ = 240,000; $M_w M_n$ = 4.1;
[2] poly(ethylene-co-octene); $M_w$ = 100,000; $M_w M_n$ = 2;
[3] methacrylate grafted polybutadiene, RICACRYL 3500, CAS #168612-08-6, available from Ricon Resins, Inc.
[4] antioxidant = 1.1 tetrakis[methylene 93,5-di-tert-butyl-4-hydroxy-hydrocinnamate] methane/tris(2,4-di-tert-butylphenyl) phosphite.

Examples 6–9

Radiation-Curable Components Having Greater Unsaturation

Examples 6–9, set forth in Table III below, were prepared such that the radiation-crosslinkable component had higher unsaturation (more methacrylate-grafted polybutadiene) when compounded and compared with the formulations in Table II (Examples 3–5). The mar resistance of Examples 6–9 after UV curing show further improvement in mar resistance over the polyolefin composition with less unsaturation in the radiation-crosslinkable component.

TABLE III

Surface Modification with Photoinitiators and UV-Curing

| Compositions (wt %) | Ex. 6 | Ex. 7 | Ex. 8 | Ex. 9 |
|---|---|---|---|---|
| Polypropylene[1] | 67.8 | 67.8 | 67.8 | 67.8 |
| Poly(ethylene-co-α-olefin)[2] | 15 | 10 | 15 | 10 |
| Methacrylate grafted polybutadiene[3] | 15 | 20 | 15 | 20 |
| Photoinitiator A | 2 | 2 | 0 | 0 |
| Photoinitiator B | 0 | 0 | 2 | 2 |
| Antioxidant[4] | 0.2 | 0.2 | 0.2 | 0.2 |
| Irradiation Source | Mercury Lamp with "D"0 Bulb | | | |
| Atmosphere | Air | | | |
| Irradiation Energy | Two level: 2.7 and 5.5 J/cm$^2$ | | | |
| Test Results after UV-cure: | | | | |
| Shore "D" | | | | |
| (0 J/cm$^2$) | 65 | 65 | 65 | 65 |
| (2.7 J/cm$^2$) | 68 | 68 | 69 | 67 |
| (5.5 J/cm$^2$) | 69 | 69 | 70 | 68 |
| Rockwell "R" | | | | |
| (0 J/cm$^2$) | 69 | 64 | 68 | 62 |
| (2.7 J/cm$^2$) | 73 | 76 | 76 | 77 |
| (5.5 J/cm$^2$) | 75 | 79 | 80 | 80 |
| Scratch Rating (Solvay Test*) | | | | |
| (0 J/cm$^2$) | 3.5 | 4.0 | 3.5 | 4.0 |
| (2.7 J/cm$^2$) | 2.5 | 2.0 | 4.0 | 2.5 |
| (5.5 J/cm$^2$) | 1.5 | 1.5 | 2.0 | 1.5 |

[1] isotactic polypropylene, $M_w$ = 240,000; $M_w M_n$ = 4.1;
[2] poly(ethylene-co-octene); $M_w$ = 100,000; $M_w M_n$ = 2;
[3] methacrylate grafted polybutadiene, RICACRYL 3500, CAS #168612-08-6, available from Ricon Resins, Inc.
[4] antioxidant = 1.1 tetrakis[methylene 93,5-di-tert-butyl-4-hydroxy-hydrocinnamate] methane/tris(2,4-di-tert-butylphenyl) phosphite.

Example 10

Effect of UV Radiation & Thermal Treatment on Surface Durability

Example 10, set forth in Table IV below, was prepared to examine the effect of treating the plastic component with UV radiation followed by a thermal cure. The formulation when exposed to UV radiation and a subsequent thermal treatment resulted in a surface with improved mar resistance compared with a plastic component which was exposed to the same UV irradiation but without the thermal cure.

TABLE IV

Effect of UV Radiation and Thermal Curing

| Composition (wt %) | Ex. 10 |
|---|---|
| Polypropylene[1] | 68.4 |
| Methacrylate grafted polybutadiene[2] | 29.4 |
| Photoinitiator B | 2.0 |
| Antioxidant[3] | 0.2 |
| Irradiation Source | Mercury Lamp with "D" Bulb |
| Atmosphere | Air |
| Irradiation Energy | 10.8 J/cm$^2$ |
| Thermal Cure | 80° C./2 hours |
| Test Results After UV-cure: | |
| Scratch Rating (Solvay) | |
| (0 J/cm$^2$) | 5.0 |
| (10.8 J/cm$^2$) | 1.5 |
| (10.8 J/cm$^2$ + 80° C./2 hours) | 1.0 |

Example 11

Incorporation of Stabilizers

Articles prepared according to Example 10 which additionally contain a hindered amine with a molar mass less than 2000, preferably a hindered amine with a molecular weight between 400–1000, a hindered amine with a molar mass greater than 2000, preferably a hindered amine with a molecular weight between 2000–4000, a UV absorber of the hydroxyphenyl benzotriazole class or mixtures thereof, exhibit improved mar resistance and stability against the deleterious effects of UV light and thermal exposure.

Although preferred embodiments of the invention have been described in the foregoing description, it will be understood that the invention is not limited to the specific embodiments disclosed herein but is capable of numerous modifications by one of ordinary skill in the art. It will be understood that the materials used and the chemical details may be slightly different or modified without departing from the methods and compositions disclosed and taught by the present invention.

What is claimed is:

1. A thermoplastic polyolefin composition comprising a blend of:

a base component of a thermoplastic polyolefin comprising a blend of a crystalline or semicrystalline poly-α-olefin and an amorphous poly-α-olefin;

at least one radiation-crosslinkable component which comprises a methacrylate grafted polybutadiene present in an amount sufficient to enhance surface durability of the thermoplastic polyolefin component when radiation-cured; and at least one photoinitiator present in an amount sufficient to initiate crosslinking of the radiation-crosslinkable component.

2. A composition according to claim 1 which further comprises a filler in an amount of between 0.1 and 30 percent by weight.

3. A composition according to claim 2 wherein the filler comprises calcium carbonate, clay, talc, mica, glass, zinc oxide, titanium dioxide, wollastonite, silica, or mixtures thereof.

4. A composition according to claim 1 wherein the radiation crosslinkable component is present in an amount of about 1 to 30 percent by weight of the thermoplastic polyolefin composition.

5. A composition according to claim 1 wherein the photoinitiator comprises benzoin and benzoin ether compounds; benzil ketal compounds; α,α-dialkyloxy acetophenone compounds; α-aminoalkylphenone compounds; α-hydroxyalkylphenone compounds; acylphosphine oxides; acylphosphine sulfides; phenylglyoxylate compounds; O-acyl-2-oximino ketone compounds; benzophenone compounds; Michler's ketone compounds; thioxanthone compounds; a polymer-bound compound of the previously recited photoinitiators; or mixtures thereof.

6. A composition according to claim 5 wherein the photoinitiator is a benzil ketal compound or an acylphosphine oxide.

7. A composition according to claim 1 wherein the photoinitiator is present in an amount of about 0.01 to 5 percent by weight of the composition.

8. A composition according to claim 1 wherein the radiation-crosslinkable component is crosslinked to provide enhanced surface durability with an outer surface of the composition containing a sufficient amount of the crosslinked component to provide a scratch rating of 2 or lower on the Solvay scale.

9. A composition according to claim 1 which additionally contains at least one stabilizer selected from the group consisting of phenolic antioxidants, phosphites, hydroxylamines, hindered amines, UV absorbers and combinations thereof.

10. A composition according to claim 1 wherein the thermoplastic polyolefin base component comprises a blend of semicrystalline polypropylene and amorphous ethylene/α-olefin copolymer.

11. A composition according to claim 1 wherein the amorphous poly-α-olefin comprises amorphous copolymer of ethylene and at least one diene.

12. A method of providing a cured thermoplastic polyolefin composition having enhanced surface durability which comprises:
 preparing a mixture comprising a thermoplastic polyolefin base component which comprises a blend of a crystalline or semicrystalline poly-α-olefin and an amorphous poly-α-olefin; at least one radiation-crosslinkable component which comprises a methacrylate grafted polybutadiene in an amount sufficient to enhance the surface durability of the base component when radiation cured; and at least one photoinitiator in an amount sufficient to facilitate crosslinking of the radiation-crosslinkable component when the thermoplastic polyolefin composition is exposed to radiation; and
 exposing a surface of the thermoplastic polyolefin composition to radiation in an amount sufficient to crosslink the radiation-crosslinkable component at least at the surface, thereby providing a thermoplastic polyolefin composition having enhanced surface durability.

13. A method according to claim 12 wherein the radiation is selected to be ultraviolet, electron beam, gamma, visible, microwave, infrared or thermal radiation, or mixtures thereof.

14. A method according to claim 13 wherein the radiation is ultraviolet radiation.

15. A method according to claim 12 wherein the radiation is imparted at a power of 0.1 $J/cm^2$ and above and at a wavelength between 200 and 500 nm.

16. A method according to claim 12 wherein the composition additionally contains at least one stabilizer selected from the group consisting of phenolic antioxidants, phosphites, hydroxylamines, hindered amines, UV absorbers and combinations thereof.

17. A method according to claim 12 wherein the radiation-crosslinkable component is present in about 0.01 to 20 percent by weight of the composition, the photoinitiator is 2,2-dimethoxy-2-phenylacetophenone or 2-methyl-1-(4-methylthiophenyl)-2-morpholino-propan-1-one or a mixture of bis(2,6-dimethoxybenzoyl)-2,4,4-trimethylpentyl phosphine oxide and 1-hydroxy-cyclohexylphenyl ketone that is present in about 0.1 to 5 percent by weight of the composition, and a filler is added to the mixture.

18. A thermoplastic polyolefin composition having enhanced surface durability which is formed by the method according to claim 12.

19. A composition according to claim 1 wherein the thermoplastic polyolefin base component is a blend of a semicrystalline propylene homopolymer or copolymer with another poly-α-olefin and an amorphous copolymer or terpolymer of ethylene with another α-olefin or diene.

20. A thermoplastic polyolefin molded article which will have enhanced surface durability when a surface of the article is exposed to radiation, comprising a blend of:
 a base component of a thermoplastic polyolefin comprising a blend of a crystalline or semicrystalline poly-α-olefin and an amorphous poly-α-olefin;
 at least one radiation-crosslinkable component selected from the group consisting of ethylene/propylene/diene copolymer, polybutadiene, methacrylate grafted polybutadiene, polyisoprene, and mixture thereof, present in an amount sufficient to enhance surface durability of the thermoplastic polyolefin component when radiation-cured; and
 at least one photoinitiator present in an amount sufficient to initiate crosslinking of the radiation-crosslinkable component.

21. A molded article according to claim 20 which further comprises a filler in an amount of between 0.1 and 30 percent by weight.

22. A molded article according to claim 21 wherein the filler comprises calcium carbonate, clay, talc, mica, glass, zinc oxide, titanium dioxide, wollastonite, silica, or mixtures thereof.

23. A molded article according to claim 20 wherein the radiation-crosslinkable component is present in an amount of about 1 to 30 percent by weight of the thermoplastic polyolefin composition.

24. A molded article according to claim 20 wherein the photoinitiator comprises benzoin and benzoin ether compounds; benzil ketal compounds; α,α-dialkyloxy acetophenone compounds; α-aminoalkylphenone compounds; α-hydroxyalkylphenone compounds; acylphosphine oxides; acylphosphine sulfides; phenylglyoxylate compounds; O-acyl-2-oximino ketone compounds; benzophenone compounds; Michler's ketone compounds; thioxanthone compounds; a polymer-bound compound of the previously recited photoinitiators; or mixtures thereof.

25. A molded article according to claim 24 wherein the photoinitiator is a benzil ketal compound or an acylphosphine oxide.

26. A molded article according to claim 20 wherein the photoinitiator is present in an amount of about 0.01 to 5 percent by weight of the composition.

27. A molded article according to claim 20, which when exposed to radiation, will have enhanced surface durability as measured by having a scratch rating of 2 or lower on the Solvay scale.

28. A molded article according to claim 20 which additionally contains at least one stabilizer selected from the group consisting of phenolic antioxidants, phosphites, hydroxylamines, hindered amines, UV absorbers and combinations thereof.

29. A molded article according to claim 20 wherein the thermoplastic polyolefin base component comprises a blend of semicrystalline polypropylene and amorphous ethylene/α-olefin copolymer.

30. A molded article according to claim 20 wherein the amorphous poly-α-olefin comprises amorphous copolymer of ethylene and at least one diene.

31. A molded article according to claim 20 which has been exposed to radiation.

32. A molded article according to claim 20 wherein the thermoplastic polyolefin base component is a blend of a semicrystalline propylene homopolymer or copolymer with another poly-α-olefin and an amorphous copolymer or terpolymer of ethylene with another α-olefin or diene.

\* \* \* \* \*